(12) United States Patent
Digmann et al.

(10) Patent No.: US 8,943,630 B2
(45) Date of Patent: Feb. 3, 2015

(54) SEAL FOR DOCK LEVELER LIP HINGE

(75) Inventors: Charles J. Digmann, Dubuque, IA (US); Jack T. Droullard, Epworth, IA (US); Timothy J. Schmidt, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 13/479,513

(22) Filed: May 24, 2012

(65) Prior Publication Data
US 2012/0227192 A1    Sep. 13, 2012

Related U.S. Application Data

(63) Continuation of application No. 11/965,927, filed on Dec. 28, 2007, now abandoned.

(51) Int. Cl.
*E01D 1/00* (2006.01)
*F16F 15/02* (2006.01)
*B65G 69/28* (2006.01)

(52) U.S. Cl.
CPC ................................. *B65G 69/2876* (2013.01)
USPC .......................................... 14/69.5; 277/647

(58) Field of Classification Search
USPC ........ 14/69.5, 71.1, 71.5, 71.3; 277/543, 545, 277/630, 644, 647, 654; 16/221, 223, 225, 16/226, 227
See application file for complete search history.

(56) References Cited

U.S. PATENT DOCUMENTS

| 712,240 | A | 10/1902 | Barnes et al. |
| 1,452,703 | A | 4/1923 | Pollard |
| 1,783,305 | A * | 12/1930 | Olson ........................ 49/482.1 |
| 2,198,084 | A | 4/1940 | Jacobson |
| 2,549,284 | A | 4/1951 | Baker |
| 3,254,453 | A | 6/1966 | Dennis |
| 3,352,314 | A | 11/1967 | Frommelt et al. |

(Continued)

FOREIGN PATENT DOCUMENTS

| DE | 2239483 | 2/1974 |
| DE | 4238221 | 2/1994 |

(Continued)

OTHER PUBLICATIONS

Canadian Intellectual Property Office, "Notice of Allowance", issued in connection with Canadian application serial No. 2,710,751, issued Jan. 8, 2013, 1 page.

Intellectual Property Office of P.R. China, "Second Office Action," with English translation, issued in connection with Chinese application serial No. 2008801230997, issued Nov. 15, 2012, 6 pages.

(Continued)

*Primary Examiner* — Abigail A Risic
(74) *Attorney, Agent, or Firm* — Hanley, Flight & Zimmerman, LLC

(57) ABSTRACT

A dock leveler comprising a vehicle-engaging lip pivotally coupled to the vertically adjustable front edge of a deck includes a seal or series of seal segments that close one or more air gaps that exist in the area where the lip is hinged to the deck. Such gaps are particularly large when the lip hinge comprises a hinge pin that couples a series of lugs extending from underneath the deck to a series of lugs extending from the lip, wherein the lugs are spaced apart along the length of the hinge pin. The seal or seal segments could be above the deck, below the deck, or interposed between the adjoining edges of the deck and the lip. In some cases, the seal is provided by an air curtain or by a tube that is inflatable or hermetically sealed.

16 Claims, 15 Drawing Sheets

(56) References Cited

U.S. PATENT DOCUMENTS

| | | | |
|---|---|---|---|
| 4,110,860 | A | 9/1978 | Neff et al. |
| 4,272,934 | A | 6/1981 | Cowden et al. |
| 4,286,410 | A | 9/1981 | Hahn |
| 4,293,969 | A | 10/1981 | Frommelt |
| 4,349,992 | A | 9/1982 | Layne |
| 4,422,199 | A | 12/1983 | Frommelt |
| 4,426,816 | A | 1/1984 | Dean et al. |
| 4,455,703 | A | 6/1984 | Fromme et al. |
| 4,557,008 | A | 12/1985 | Jurden |
| 4,570,291 | A | 2/1986 | Smith et al. |
| 4,601,142 | A | 7/1986 | Frommelt |
| 4,679,364 | A | 7/1987 | Fettig et al. |
| 4,682,382 | A | 7/1987 | Bennett |
| 4,691,478 | A | 9/1987 | Lorg |
| 4,709,121 | A | 11/1987 | Shores |
| 4,711,059 | A | 12/1987 | Layne |
| 4,750,299 | A | 6/1988 | Frommelt et al. |
| 4,776,052 | A | 10/1988 | Delgado et al. |
| 4,805,362 | A | 2/1989 | Frommelt et al. |
| 4,845,892 | A | 7/1989 | Pinto |
| 5,001,799 | A | 3/1991 | Alexander et al. |
| 5,001,862 | A * | 3/1991 | Albenda ................. 49/383 |
| 5,048,246 | A | 9/1991 | Sullivan |
| 5,106,037 | A | 4/1992 | Sherrill |
| 5,125,196 | A | 6/1992 | Moody |
| 5,185,977 | A | 2/1993 | Brockman et al. |
| 5,313,681 | A | 5/1994 | Alexander |
| 5,396,676 | A | 3/1995 | Alexander et al. |
| 5,440,772 | A | 8/1995 | Springer et al. |
| 5,442,825 | A | 8/1995 | Hahn et al. |
| 5,553,343 | A | 9/1996 | Alexander |
| 5,781,953 | A | 7/1998 | Winter |
| 5,791,953 | A | 8/1998 | Gunderson et al. |
| 6,081,954 | A | 7/2000 | Palmersheim et al. |
| 6,276,016 | B1 | 8/2001 | Springer |
| 6,276,026 | B1 | 8/2001 | Wille |
| 6,298,605 | B1 | 10/2001 | Delefosse et al. |
| 6,381,905 | B1 * | 5/2002 | Rissone ................. 49/495.1 |
| 6,502,268 | B2 | 1/2003 | Ashelin et al. |
| 6,654,976 | B2 | 12/2003 | Digmann et al. |
| 6,715,177 | B1 | 4/2004 | Lagergren-Julander |
| 6,842,930 | B2 | 1/2005 | Massey et al. |
| 7,047,694 | B2 * | 5/2006 | Salzman ................. 49/462 |
| 7,062,813 | B2 | 6/2006 | Hoofard et al. |
| 7,134,159 | B2 | 11/2006 | Muhl et al. |
| 7,146,673 | B1 | 12/2006 | Digmann et al. |
| 7,213,285 | B2 * | 5/2007 | Mitchell ................. 14/69.5 |
| 7,334,281 | B2 * | 2/2008 | Digmann et al. ............. 14/71.1 |
| 7,584,517 | B2 | 9/2009 | Digmann et al. |
| 7,861,465 | B1 * | 1/2011 | Christ et al. ................. 49/506 |
| 2004/0107647 | A1 | 6/2004 | Salzman |
| 2004/0261335 | A1 | 12/2004 | Eungard |
| 2007/0101517 | A1 | 5/2007 | Digmann et al. |
| 2007/0101518 | A1 | 5/2007 | Digmann et al. |
| 2007/0101519 | A1 | 5/2007 | Digmann et al. |
| 2007/0283636 | A1 | 12/2007 | Bernacki et al. |
| 2009/0126130 | A1 | 5/2009 | Bettendorf et al. |
| 2009/0165224 | A1 | 7/2009 | Digmann et al. |
| 2010/0264596 | A1 * | 10/2010 | Whitley et al. ............... 277/316 |

FOREIGN PATENT DOCUMENTS

| | | |
|---|---|---|
| EP | 1445222 | 8/2004 |
| GB | 486162 | 5/1938 |
| NL | 7707810 | 1/1979 |

OTHER PUBLICATIONS

Rite-Hite Holding Corporation and Frommelt Products Corporation, "Roller Seal for Scissors Lift," Drawing No. D 692 0323, E.S.P.N. Installation, Oct. 30, 1996, 4 pages.

Frommelt Industries Inc., "VHL Vertically-Movable Bottom Pad and Detail," Blueprint Nos. 692-0125 and 692-0126, Oct. 7, 1988, 2 pages.

Frommelt Industries Inc., "Adjustable Bottom Pad (Meijer Pad)," Drawing No. 692-0029, Oct. 17, 1995, 1 page.

Octo Inc., "Roller Curtain Lift Guards," Nov. 1, 2001, 2 pages.

International Bureau, "International Preliminary Report on Patentability," issued in connection with international application serial No. PCT/US2008/084861, mailed Jul. 8, 2010, 9 pages.

International Searching Authority, "International Search Report," issued in connection with international application serial No. PCT/US2008/084861, mailed Feb. 16, 2009, 7 pages.

International Searching Authority, "Written Opinion of the International Searching Authority," issued in connection with international application serial No. PCT/US2008/084861, mailed Feb. 16, 2009, 9 pages.

European Patent Office, "Office Communication," issued in connection with European application serial No. 08 866 513.8, issued Dec. 7, 2011, 4 pages.

State Intellectual Property Office of P.R. China, "First Office Action," issued in connection with Chinese application serial No. 200880123099.7, issued Feb. 22, 2012, 11 pages.

Australian Government IP Australia, "Examination Report," issued in connection with Australian application serial No. 2008343549, issued Mar. 11, 2011, 3 pages.

Canadian Patent Office, "First Office Action," issued in connection with Canadian application serial No. 2,710,751, issued Apr. 11, 2012, 4 pages.

United States Patent and Trademark Office, "Final Office Action," issued in connection with U.S. Appl. No. 11/965,927, mailed Feb. 27, 2012, 12 pages.

United States Patent and Trademark Office, "Non-Final Office Action", issued in connection with U.S. Appl. No. 11/965,927, mailed Oct. 3, 2011, 17 pages.

United States Patent and Trademark Office, "Final Office Action," issued in connection with U.S. Appl. No. 11/965,927, mailed Apr. 13, 2011, 21 pages.

United States Patent and Trademark Office, "Non-Final Office Action," issued in connection with U.S. Appl. No. 11/965,927, mailed Jul. 8, 2010, 22 pages.

United States Patent and Trademark Office, "Restriction," issued in connection with U.S. Appl. No. 11/965,927, Feb. 2, 2013, 10 pages.

Canadian Intellectual Property Office, "Office Action," issued in connection with Canadian Patent Application No. 2,710,751, Mar. 14, 2012, 4 pages.

State Intellectual Property Office of the People'S Republic of China, "Third Office Action," issued in connection with Chinese Patent Application No. 2008801230997, Jun. 19, 2013, 7 pages.

European Patent Office, "Decision to Grant a European Patent Pursuant to Article 97(1) EPC," issued in connection with European Application No. 08866513.8, on Apr. 25, 2013, 1 page.

State Intellectual Property Office of the People'S Republic of China, "Fourth Office Action," issued in connection with Chinese Patent Application No. 2008801230997, dated Dec. 10, 2013, 24 pages.

State Intellectual Property Office, "Office Action," issued in connection with Application No. 2008801230991, Jun. 6, 2014, 16 pages.

* cited by examiner

SEAL FOR DOCK LEVELER LIP HINGE

CROSS-REFERENCE TO RELATED APPLICATIONS

This patent arises from a continuation of U.S. patent application Ser. No. 11/965,927, filed Dec. 28, 2007, entitled "SEAL FOR A DOCK LEVELER LIP HINGE," which is hereby incorporated herein by reference in its entirety.

FIELD OF THE DISCLOSURE

The subject disclosure generally pertains to the lip hinge of a dock leveler and, more specifically, to a seal for such a hinge.

BACKGROUND OF RELATED ART

A typical loading dock of a building includes an exterior door with an elevated platform for loading and unloading cargo from vehicles, such as trucks and trailers. Many loading docks include a dock lever that enables personnel and material handling equipment to readily move on and off the vehicle bed during loading and unloading operations.

A typical dock leveler includes a deck that is pivotally hinged along its back edge (or is otherwise mounted for vertical movement) so that the elevation of the deck's front edge can be adjusted to generally match the elevation of vehicle's bed. An extension plate or lip extends outward from the deck's front edge so that the lip can span the gap between the rear edge of the vehicle and the front edge of the deck, thereby creating a bridge between the deck and the vehicle's bed. A lip hinge pivotally coupling the lip to the deck allows the lip to pivot between an extended operative position (where the lip is resting upon the bed of the vehicle) and a pendant position for when the dock leveler is not in use or during certain types of loading and unloading operations. Some known deck and lip hinge form a significant gap and/or a series of gaps between the front edge of the deck and the lip when the lip is stored in a pendant position. Such a gap or series of gaps can introduce outdoor air into the pit area directly underneath the deck.

DESCRIPTION OF THE PREFERRED EXAMPLES

Figure 1:
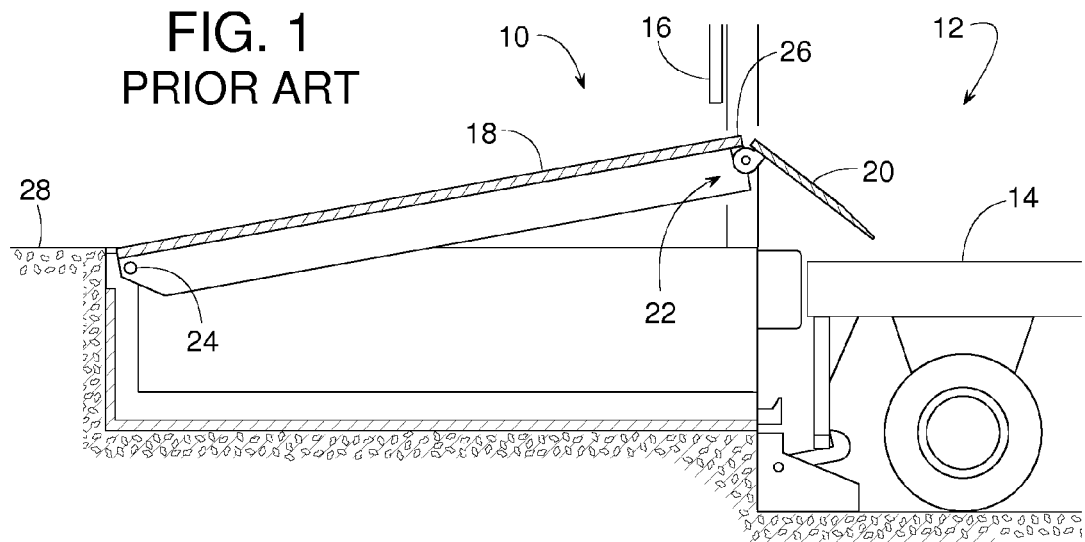
FIG. 1 is a schematic side view of a prior art dock leveler at a loading dock.
Figure 2:
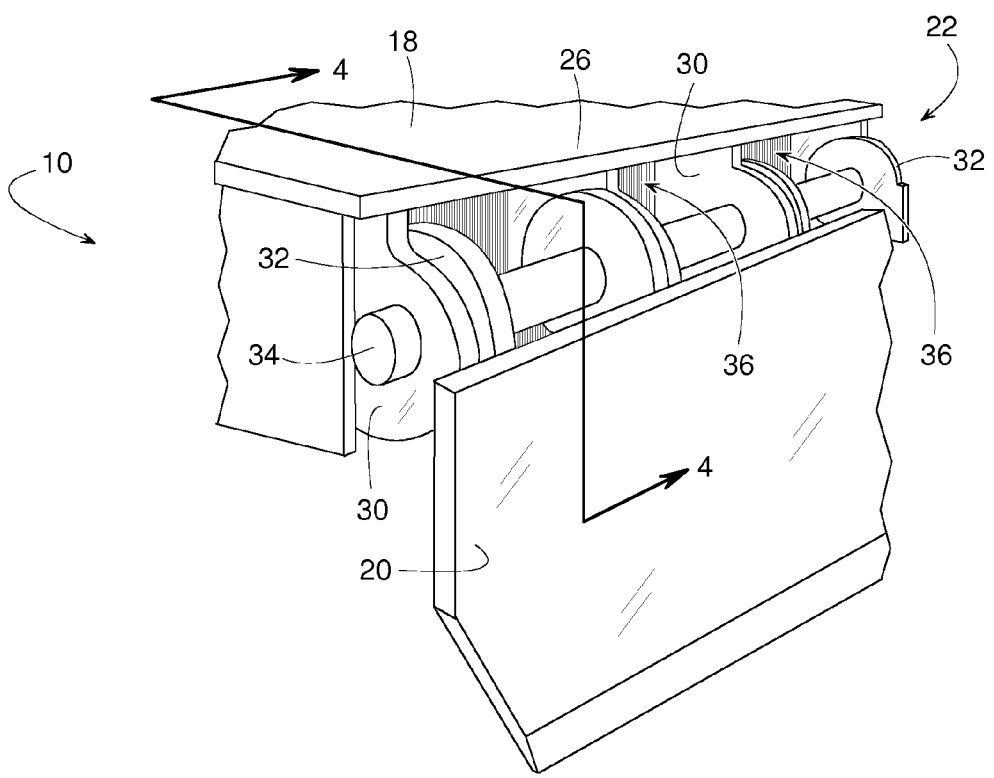
FIG. 2 is a perspective view of a prior art dock leveler.
Figure 3:
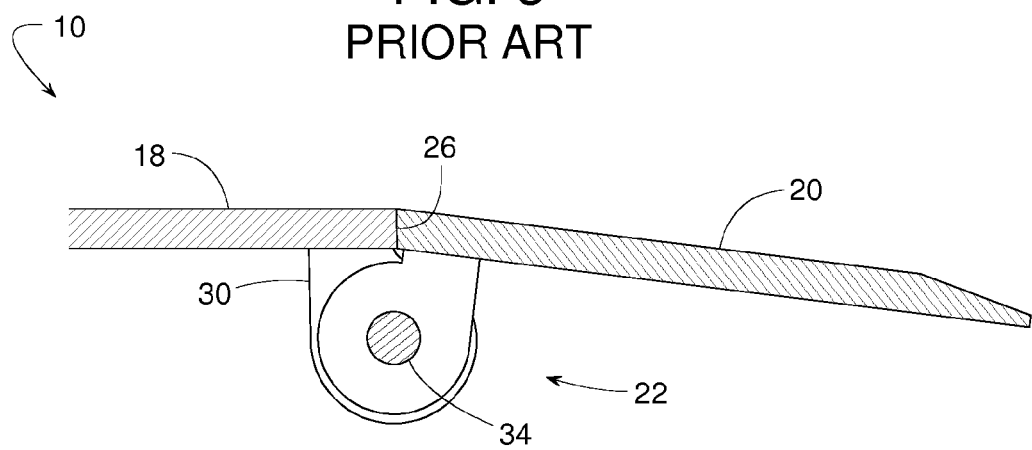
FIG. 3 is a cross-sectional view similar to FIG. 4 but showing a lip of the dock leveler in an extended position.
Figure 4:
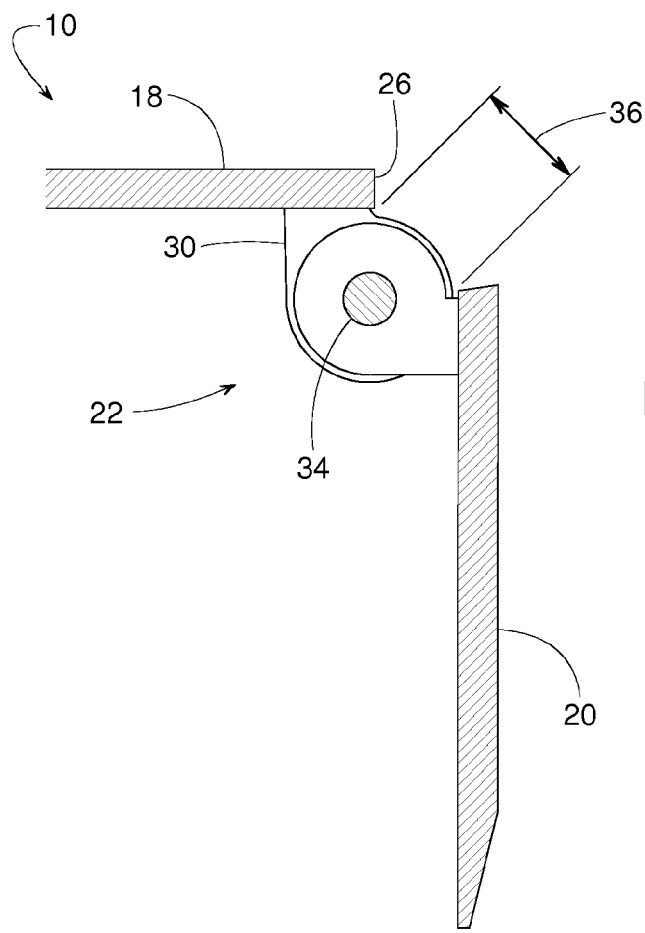
FIG. 4 is a cross-sectional view taken along line 4-4 of FIG. 2.

FIGS. 1-4 illustrate a conventional dock leveler 10 installed at a loading dock 12 to facilitate the loading and unloading of a vehicle 14 at a vertically movable door 16. Dock leveler 10 comprises a deck 18, a lip 20, and a lip hinge 22. A rear deck hinge 24, or some other means, renders a front edge 26 of deck 18 vertically movable to accommodate an indeterminate bed height of vehicle 14. Lip hinge 22 pivotally couples lip 20 to deck 18 so that lip 20 can pivot between a pendant position (FIG. 4) and an extended operative position (FIG. 3). In the extended position, lip 20 can rest upon the bed of vehicle 14 to create a material handling bridge between vehicle 14 and a platform 28 of dock 12. Lip 20 can be moved to the pendant position for storage or for certain vehicle servicing operations.

Lip hinge 22 of dock leveler 10 comprises a plurality of deck lugs 30 extending from underneath deck 18 and a plurality of lip lugs 32 extending from lip 20. Lugs 30 and/or 32 can be welded or otherwise attached to their respective structure from which they extend. A hinge pin 34 couples lugs 30 to lugs 32 so that lip 20 can pivot relative to deck 18.

When the dock leveler 10 is not in use, the deck is typically stored horizontally with the lip 20 in the pendent position. In this position, a significant air gap 36 and/or series of air gaps exist between lip 20 and deck 18. In particular, the gap 36 and/or series of gaps are created by the spaced-apart hinge lugs 30 and 32 and allow outdoor air to flow to an area underneath the deck 18. If gap 36 is left exposed or unsealed, indoor or outdoor air can leak through gap 36. Such a gap 36 or series of gaps that are unsealed or exposed can introduce outdoor air into a pit area directly underneath the deck 18. If the outdoor air is sufficiently cold, condensation and frost might accumulate on the upper traffic surface of the deck 18, as the deck 18 is typically thermally conductive and exposed to relatively warm indoor air. If the outdoor air is warmer than the indoor air, moisture might condense on the underside of the deck, which can lead to corrosion of the dock leveler's 18 components.

In the following, various example methods and apparatus are disclosed to provide a mechanical and/or fluid dynamic seal that substantially prevents or obstructs or, at least controls, the airflow through gap 36.

Figure 5:
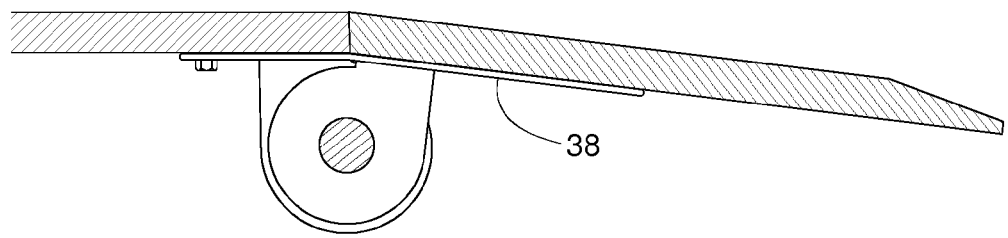
FIG. 5 is a cross-sectional view of a dock leveler with its lip extended, wherein the dock leveler includes an example seal as disclosed herein.
Figure 6:
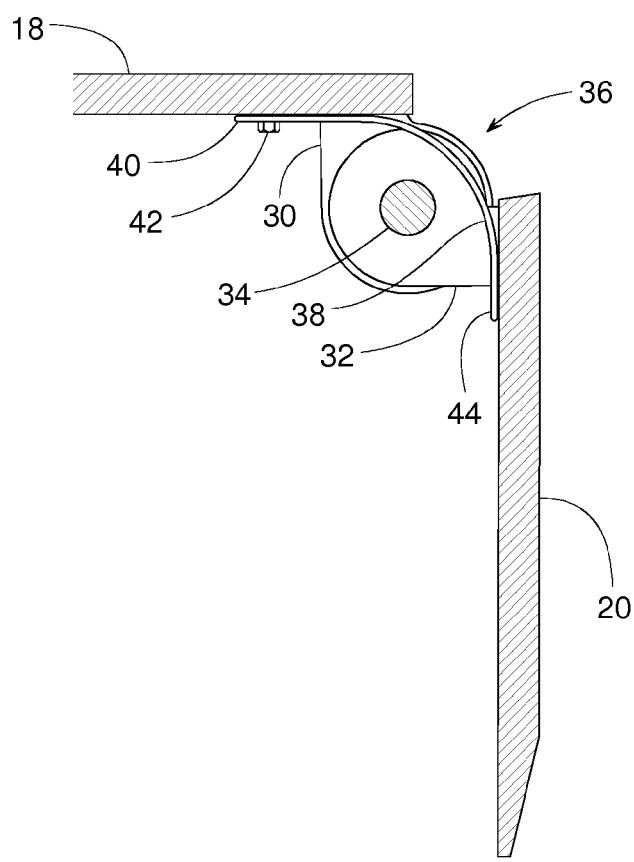
FIG. 6 is a cross-sectional view similar to FIG. 5 but with the lip in a pendant position.

An example seal 38 illustrated in FIGS. 5 and 6, for instance, includes one or more resiliently flexible members that span gap 36. A plurality of seals 38 are installed to cover a series of gaps 36 created by axially spaced apart lugs 30 and/or 32. Seal 38 can be of any appropriate shape, size, and/or material including, but not limited to, a piece of resiliently flexible material (e.g., sheet metal); a brush; or a sheet, pad or block of foam, plastic or rubber. One end 40 of seal 38 can be attached to deck 18 by way of any suitable fastener 42 including, but not limited to, a screw, adhesive, weld bead, etc. An opposite end 44 of seal 38 can slidingly seals against the underside of lip 20 as lip 20 pivots between the extended position (FIG. 5) and the pendant position (FIG. 6).

Figure 7:
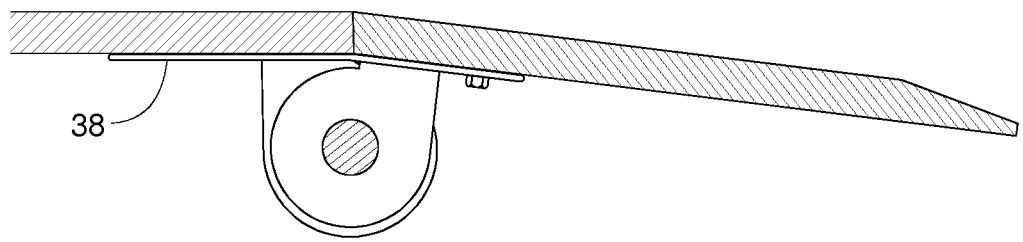
FIGS. 7 and 8 are views similar to FIGS. 5 and 6 respectively illustrating an alternative example seal as disclosed herein.
Figure 8:
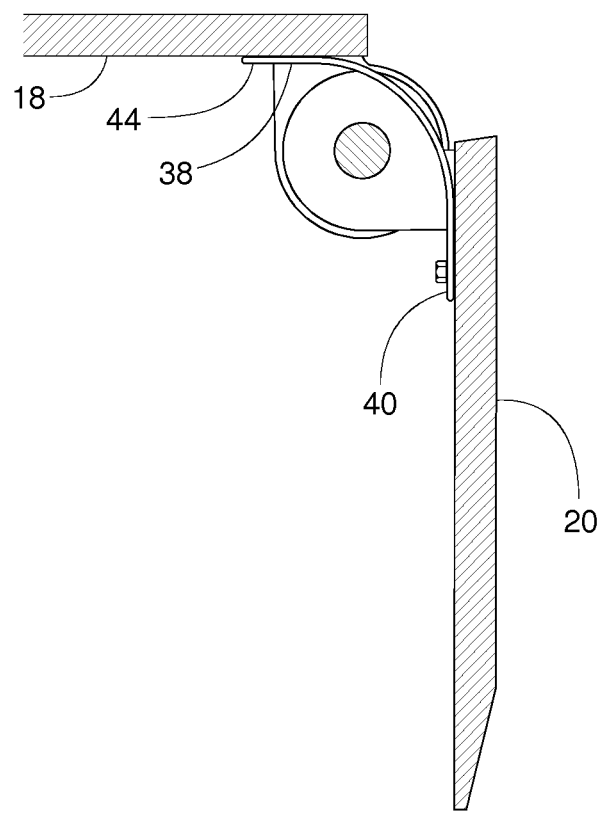

Alternatively, as illustrated in FIGS. 7 and 8, end 40 of seal 38 can be attached to lip 20 while end 44 slidingly seals against the underside of deck 18.

Figure 9:
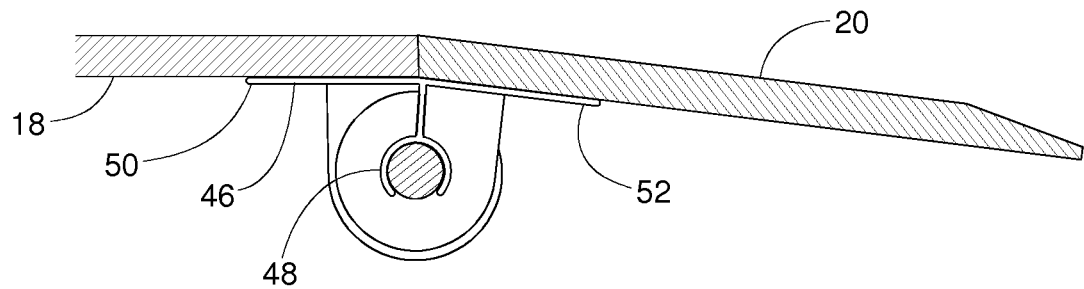
FIGS. 9 and 10 are views similar to FIGS. 5 and 6 respectively but illustrating yet another alternative example seal as disclosed herein.
Figure 10:
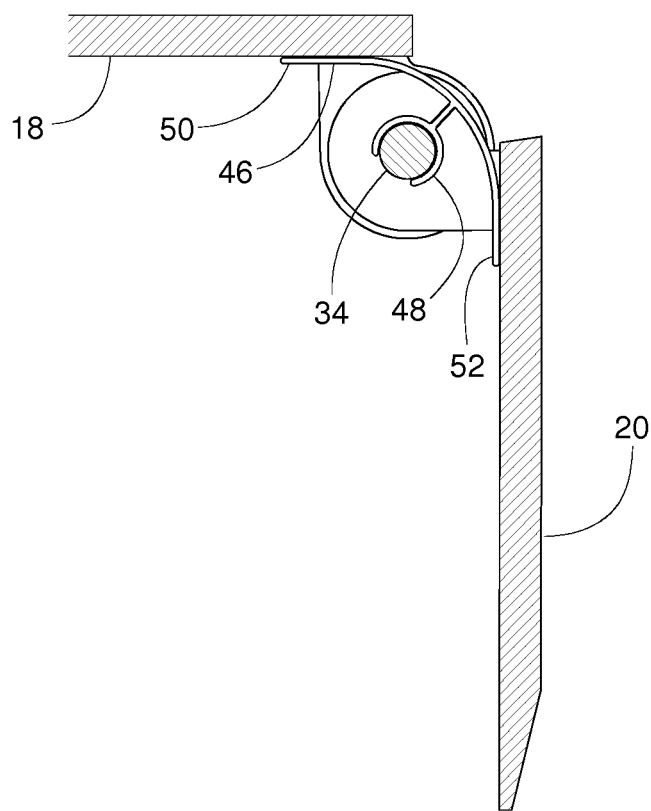

In other example implementations, a seal, similar to seal 38, may be implemented with a mounting structure or fastener. For example, as illustrated in FIGS. 9 and 10, a flexible seal 46 includes a mounting structure or fastener (illustratively, in the form of a clip 48) that attaches to hinge pin 34 so that both ends 50 and 52 of seal 46 can slidingly seal against their respective sealing surfaces of deck 18 and lip 20.

Figure 11:
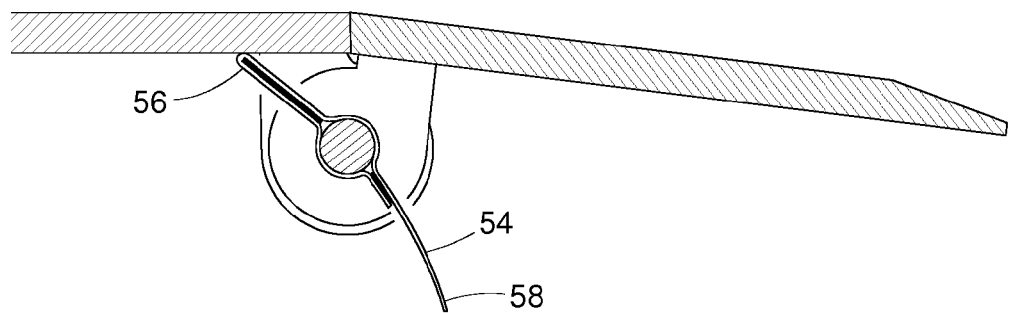
FIGS. 11 and 12 are views similar to FIGS. 5 and 6 respectively but illustrating yet another alternative example seal as disclosed herein.
Figure 12:
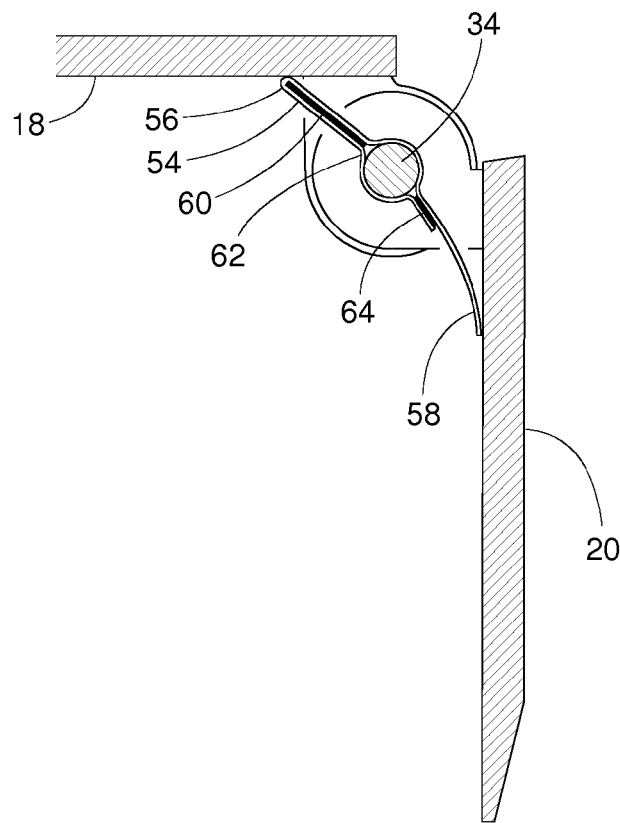

In another example, as illustrated in FIGS. 11 and 12, a seal 54 is provided which includes an alternate mounting structure to clip 48. In this example, the seal 54 comprises one or more resiliently flexible ends 56 and/or 58 that can slidingly seal against respective sealing surfaces of deck 18 or lip 20. End 56 of seal 54, for example, can comprise a polyethylene sheet of material 60 sewn within a fabric cover 62 that wraps around hinge pin 34. A hook-and-loop fastener 64 can help hold seal 54 to hinge pin 34. End 58 of seal 54 can be an extension of fabric cover 62.

Figure 13:
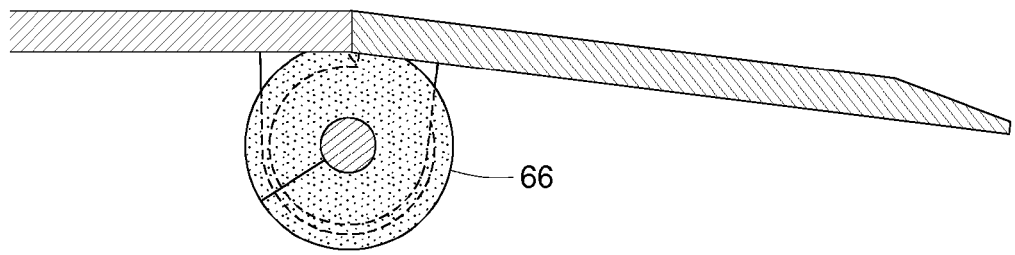
FIGS. 13 and 14 are views similar to FIGS. 5 and 6 respectively but illustrating yet another alternative example seal as disclosed herein.
Figure 14:
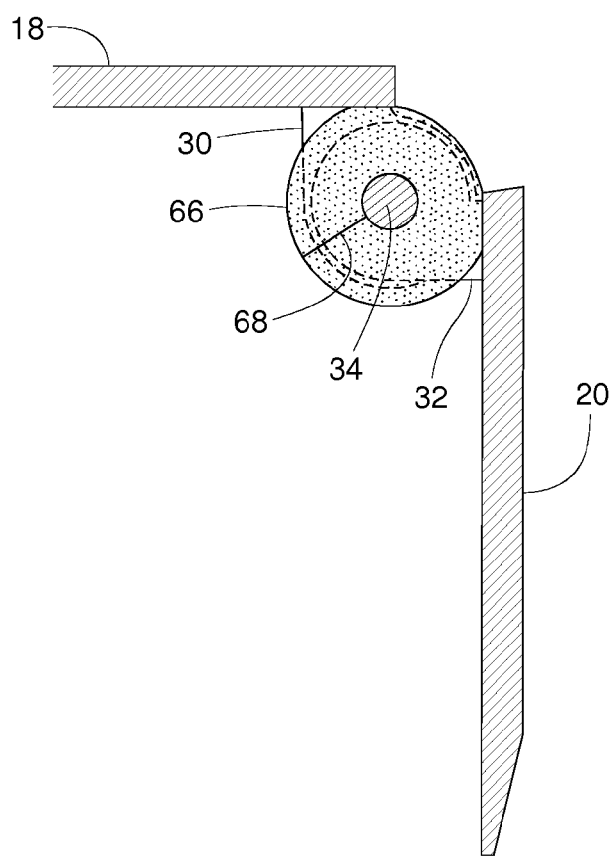

In another example shown in FIGS. 13 and 14, one or more seals 66 comprise a tubular piece or structure. The tubular piece may be made of polyurethane foam, similar to that commonly used for insulating pipes, or any other suitable insulating material(s). In some example implementations, seal 66 is implemented by a series of relatively short segments distributed axially along hinge pin 34 to cover or fill gap(s) 36 that might otherwise exist between lugs 30 and/or 32. Seal 66 preferably has an outer perimeter that can press radially outward against deck 18 and lip 20. In other example implementations, seal 66 includes a joint 68 that is held together by adhesive or by any other suitable fastening mechanism(s). In yet other example implementations, seal 66 is a jointless tube that is installed at the same time hinge pin 34 is inserted through lugs 30 and 32.

Figure 15:
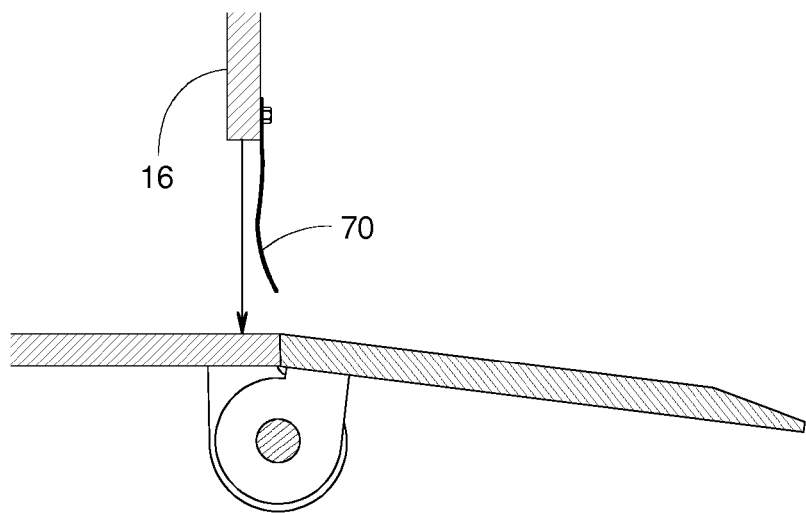
FIGS. 15 and 16 are views similar to FIGS. 5 and 6 respectively but showing an example seal suspended by an overhead door.
Figure 16:
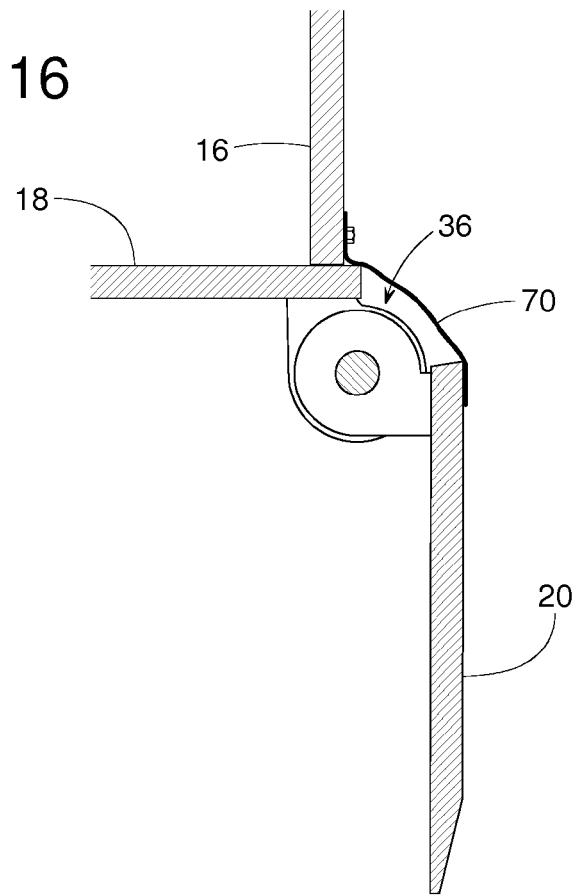
Figure 17:
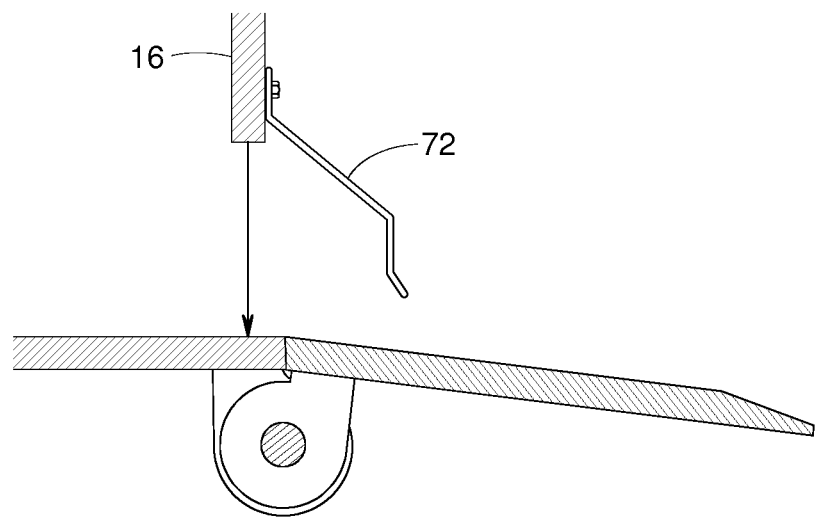
FIGS. 17 and 18 are views similar to FIGS. 15 and 16 respectively but illustrating yet another example seal suspended by an overhead door.
Figure 18:
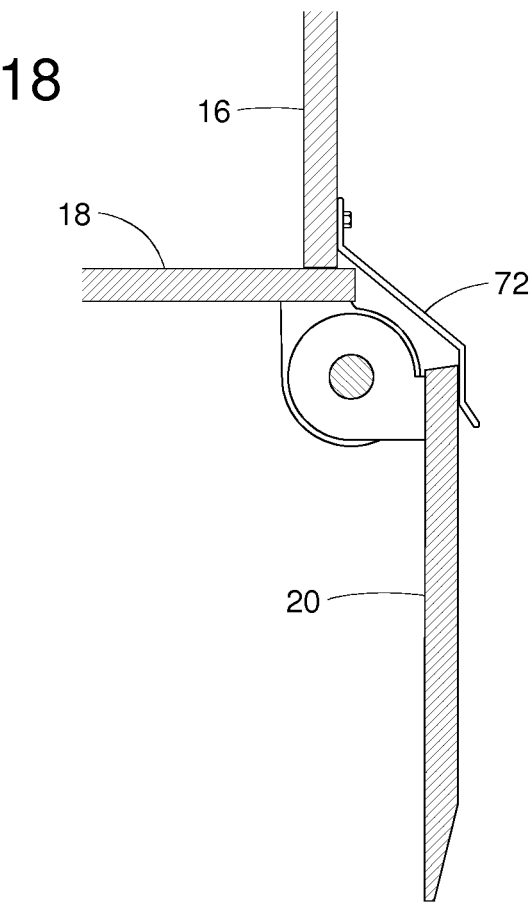

In yet another example shown in FIGS. 15 and 16, a seal 70 comprises a flexible fabric or sheet of material suspended from door 16 such that seal 70 overlays gap 36 when door 16 is in a closed position (FIG. 16). As illustrated in FIGS. 17 and 18, a seal 72 similar to seal 70 of FIGS. 15 and 16 is made of sheet metal, as shown in FIGS. 17 and 18.

Figure 19:
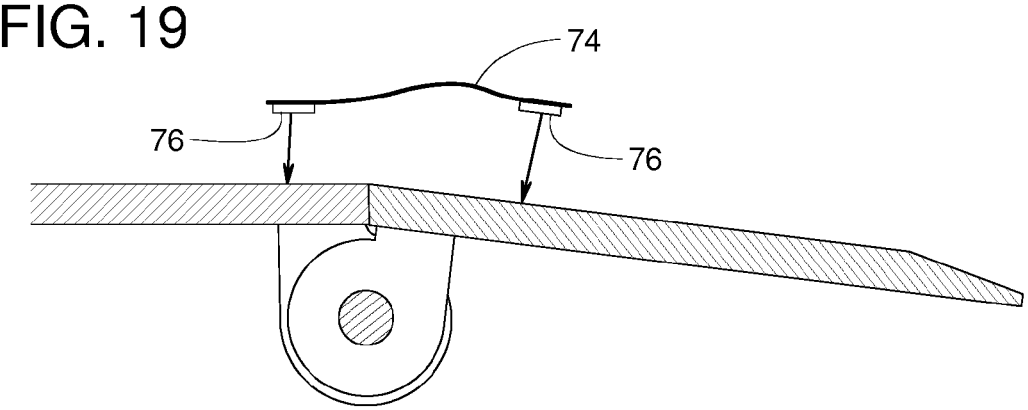
FIGS. 19 and 20 are views similar to FIGS. 5 and 6 respectively but showing an example seal that can be removed completely from the dock leveler.
Figure 20:
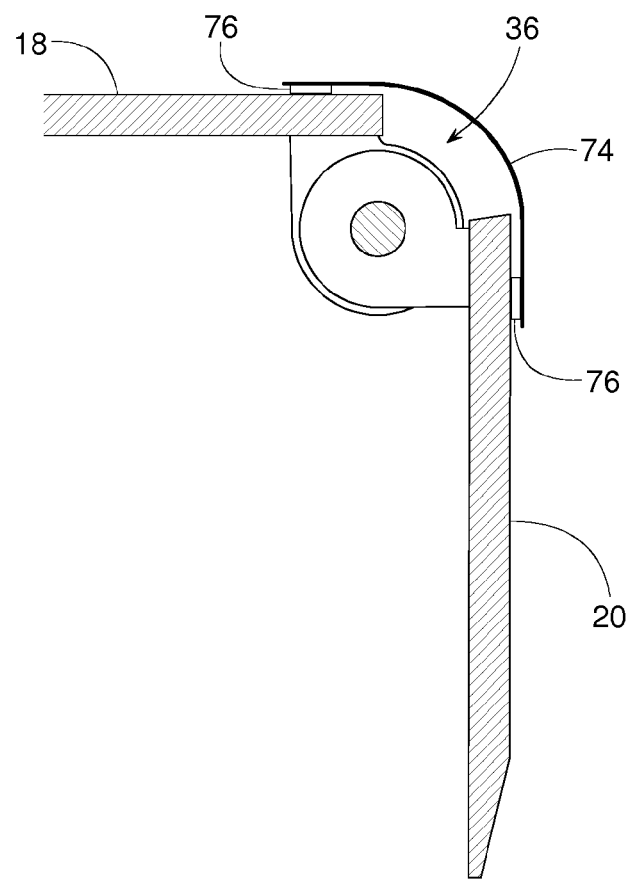

Referring to FIGS. 19 and 20, another alternative example seal 74 is made of a sheet of material removably held in place by one or more magnets 76. In this example, seal 74 is removed when the dock leveler 10 is in use. When the dock leveler 10 is inactive or stored, seal 74 can be laid over gap 36, as shown in FIG. 20.

Figure 21:
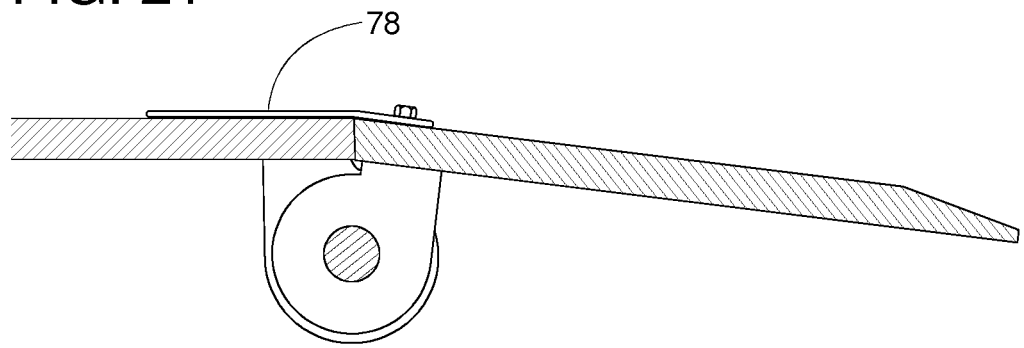
FIGS. 21 and 22 are views similar to FIGS. 5 and 6 respectively but showing an example seal that overlays the deck and lip of a dock leveler.
Figure 22:
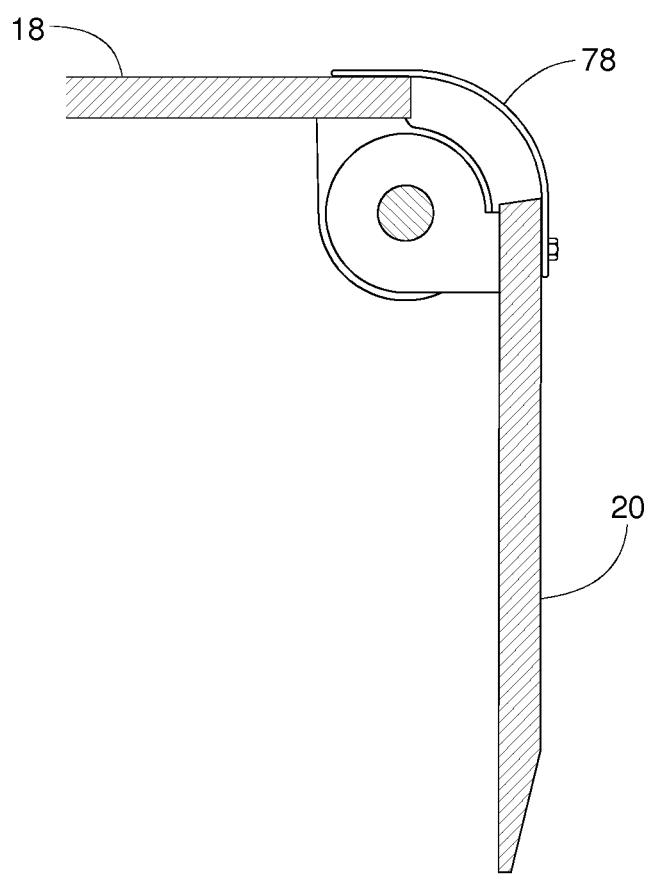

FIGS. 21 and 22 show a seal 78 that is similar to seal 38 of FIGS. 5 and 6, but installed on top of deck 18 and lip 20. In this example, seal 78 is resiliently flexible and has a relaxed shaped as shown in FIG. 22. The flexibility of seal 78 enables seal 78 to flex from its shape of FIG. 22 to that of FIG. 21. Either end of seal 78 can be attached to lip 20 (as shown) and/or attached to deck 18. This configuration is particularly advantageous because installing the seal 78 atop of deck 18 and lip 20 enables seal 78 to be made as a substantially unitary structure (e.g., a single, full-length piece extending the width of the deck) rather than having to make seal 78 as a plurality of segments that cover and/or fit within the gaps between lugs 30 and 32. Seal 78 can be made of any suitable material including, but not limited to, plastic or rubber.

Figure 23:
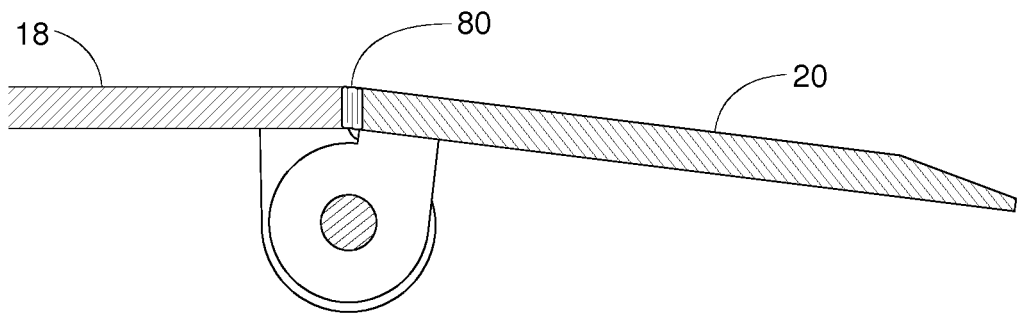
FIGS. 23 and 24 are views similar to FIGS. 5 and 6 respectively but showing an example seal that is to be pinched between the deck and lip of a dock leveler.
Figure 24:
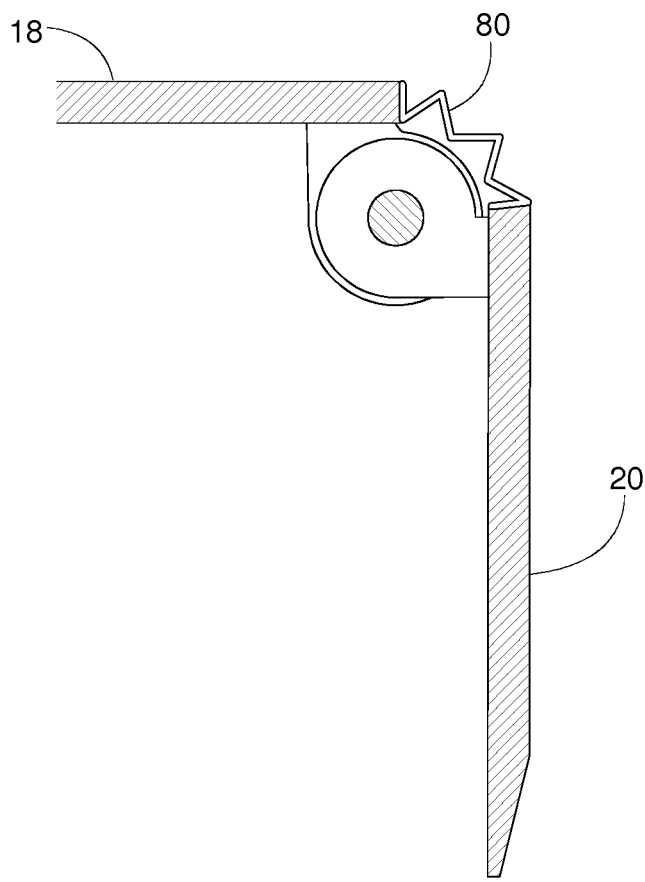

In another example shown in FIGS. 23 and 24, a seal 80 includes a serpentine or accordion-type sheet that can be made of plastic, metal, or any other suitable material(s) that can flex and/or fold. When lip 20 is in the pendant position as shown in FIG. 24, seal 80 can expand to cover any gap that might otherwise exist between lip 20 and deck 18. When lip 20 is in the extended position as shown in FIG. 23, seal 80 collapses upon being pinched between lip 20 and deck 18.

Figure 25:
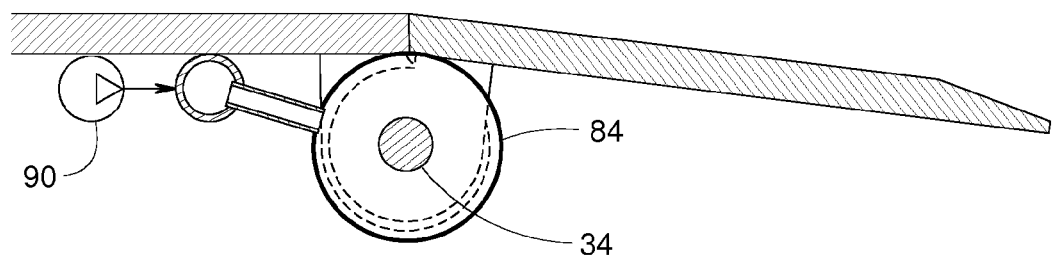
FIGS. 25 and 26 are views similar to FIGS. 5 and 6 respectively but showing an example seal that can be inflated or hermetically sealed.
Figure 26:
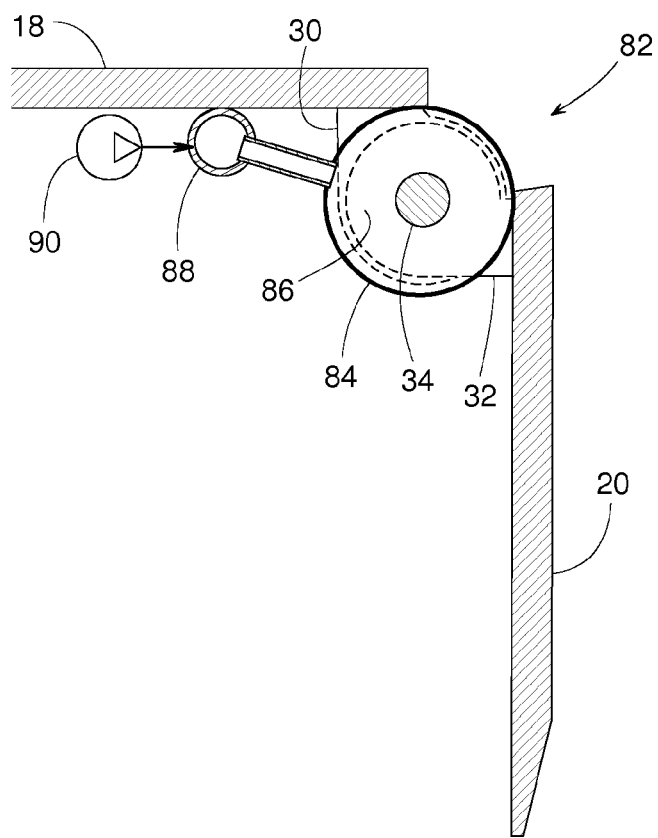

In yet another example shown in FIGS. 25 and 26, a seal 82 comprises a series of gas-filled flexible tubes 84 that are distributed along the length of hinge pin 34 to help fill the air gaps between lugs 30 and/or 32. A hollow chamber 86 within each tube 84 can be permanently charged with a fixed amount gas and hermetically sealed and/or a common manifold 88 can connect tubes 84 to the discharge of a blower 90 that delivers a supply of pressurized air into the tubes.

Figure 27:
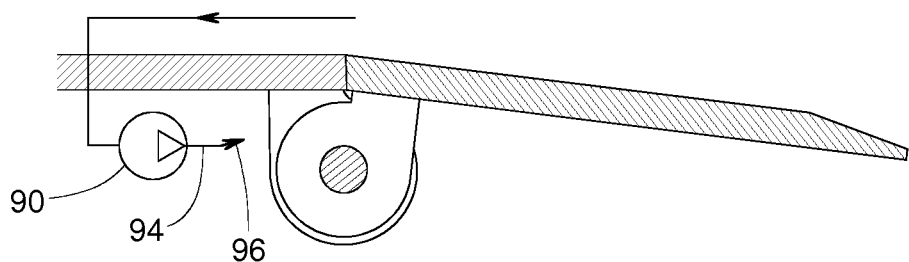
FIGS. 27 and 28 are views similar to FIGS. 5 and 6 respectively but showing an example forced current of air that determines the direction of airflow through the gap of a lip hinge.
Figure 28:
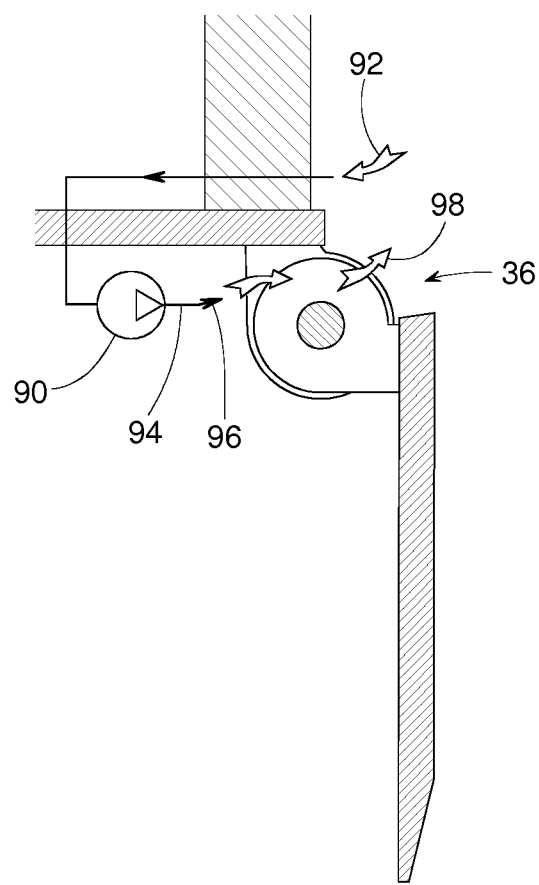

FIGS. 27 and 28 illustrate a method of substantially inhibiting outdoor air 92 from flowing into the building through gap 36. Blower 90 draws in outdoor air 92 and discharges it through a manifold 94 that includes a plurality of nozzles 96 aimed at gap 36. Nozzles 96 discharge the drawn-in outdoor air 92 upward and outward toward and/or through gap 36, thereby creating an outward flowing current of air 98 that inhibits outdoor air 92 from flowing in the opposite direction of air 98 through gap 36.

Figure 29:
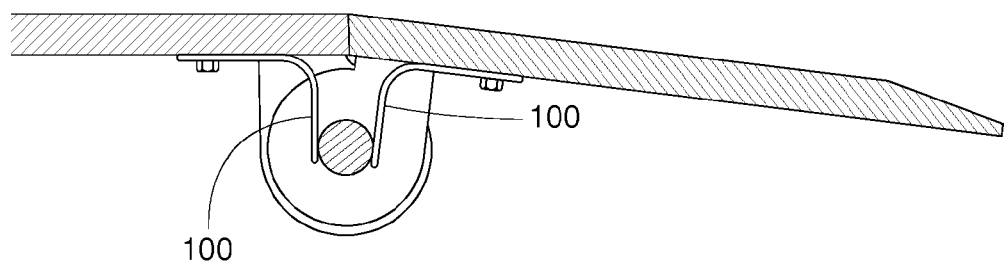
FIGS. 29 and 30 are views similar to FIGS. 5 and 6 respectively but showing an example seal in proximity with the lip hinge pin of a dock leveler.
Figure 30:
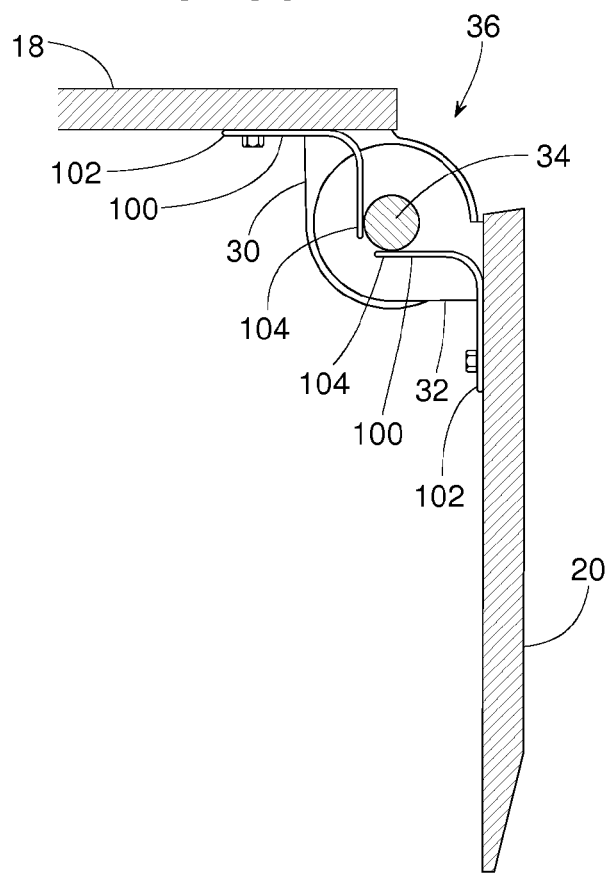

FIGS. 29 and 30 illustrate a plurality of example seals 100, each of which includes one end 102 attached to the underside of deck 18 or lip 20. An opposite end 104 of each seal 100 slidingly engages and/or is at least sufficiently close to shaft 34 to provide a substantial obstruction to substantially prevent the ingress of air attempting to pass through gap 36. In the illustrated example, seals 100 are distributed along the length of hinge pin 34 to fill the plurality of gaps created by the axially spaced apart lugs 30 and/or 32. In the illustrated example, seal 100 is preferably made of a resiliently flexible metal or polymeric material. However, in other example implementations, seal 100 can be made of a rigid material (e.g., plastic), particularly if seal 100 is positioned in close proximity to shaft 34 and does not engage and/or slide against shaft 34.

From the foregoing, it will be appreciates that example methods and apparatus have been disclosed whereby an air gap between the deck and lip of a dock leveler is at least partially blocked by a seal that extends from the lip to the deck in the vicinity of a hinge that pivotally couples the lip to the deck.

In some examples, a seal for a dock leveler's lip hinge is installed beneath the deck and the lip.

In some examples, the seal is disposed generally above the deck, lip and lip hinge.

In some examples, a seal for a dock leveler's lip hinge includes some seal segments that extend from the lip to the hinge pin and other seal segments that extend from the deck to the hinge pin.

In some examples, a seal is attached to the lip and slidingly engages the deck, and in other examples, the seal is attached to the deck and slides against the lip.

In some examples, the gap between a lip and a deck is sealed by a seal member that is attached to a hinge pin.

In some examples, the gap between a lip and a deck is sealed by a tubular seal member made of resiliently compressible foam.

In some examples, the gap between a lip and a deck is sealed by a tubular seal member that is inflated by a blower or is hermetically sealed with a fixed charge of gas.

In some examples, the gap between the lip and deck of a dock leveler is sealed by a seal member that is carried by a vertically operating door that is adjacent to the dock leveler.

In some examples, the gap between a lip and a deck is sealed by a removable seal member that can be held in place by a magnet.

In some examples, an inward flow of air through the gap between a lip and a deck of a dock leveler is inhibited by blowing a current of air outward through the gap.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A seal for a dock leveler comprising:
a flexible seal spanning a gap defined between a deck and a lip along a width of the deck, the flexible seal to substantially prevent airflow through the gap, the flexible seal being directly attached only to a hinge pivotally coupling the lip and the deck, the flexible seal to engage at least one of the lip or the deck when the lip pivots relative to the deck between a pendent position and an extended position, the flexible seal comprising a tubular seal having a longitudinal opening along a length of the tubular seal to receive the hinge, the tubular seal having a first portion comprising an inner surface defined by the longitudinal opening of the tubular seal and a second portion comprising an outer surface of the tubular seal, the tubular seal having a slit along the outer surface to enable the tubular seal to attach to a hinge pin of the hinge without having to insert the hinge pin through the longitudinal opening in a longitudinal direction.

2. The seal of claim 1, wherein an outer surface of the tubular seal is to press against the at least one surface of the lip or the deck.

3. The seal of claim 1, wherein the tubular seal comprises polyurethane foam.

4. The seal of claim 1, wherein the flexible seal comprises a fabric material.

5. The seal of claim 1, further comprising:
a plurality of deck lugs extending outwardly from underneath the deck;
a plurality of lip lugs extending from the lip; and
a hinge pin coupling the plurality of deck lugs to the plurality of lip lugs to pivotally couple the lip and the deck.

6. The seal of claim 5, wherein the gap comprises a plurality of gaps between adjacent ones of the deck lugs and the lip lugs, the flexible seal being attached to the hinge pin.

7. The seal of claim 1, wherein the flexible seal is positioned underneath the deck and the lip when the lip is in the extended position and the pendent position.

8. The seal of claim 1, wherein a longitudinal axis defined by the longitudinal opening is coaxially aligned with a longitudinal axis of a hinge pin of the hinge when the flexible seal is coupled to the hinge.

9. The seal of claim 6, wherein the tubular seal comprises a plurality of relatively short discrete tubular seal segments distributed axially along the hinge to at least one of cover or fill the plurality of gaps between the lip and the deck.

10. The seal of claim 1, wherein a hinge pin of the hinge extends through the longitudinal opening.

11. The seal of claim 1, wherein the gap is defined by opposing edges of the lip and the deck, and the flexible seal is a single flexible structure supported only by the hinge and positioned such that, when the opposing edges of the lip and the deck engage one another, the seal is not disposed between the edges.

12. The seal of claim 5, wherein the flexible seal is to attach to the hinge pin after the hinge pin has been coupled to the plurality of lip lugs and the plurality of deck lugs.

13. The seal of claim 1, wherein an outer surface of the flexible seal is positioned to engage the lip or the deck when the flexible seal is coupled to the hinge.

14. The seal of claim 1, wherein a hinge pin of the hinge extends through the longitudinal opening.

15. A seal for a dock leveler comprising:
a flexible seal spanning a gap along a width of a deck and a lip, the flexible seal to cover the gap to substantially prevent airflow through the gap, the flexible seal being directly attached only to a hinge pin pivotally coupling the lip and the deck, the flexible seal to engage at least one of the lip or the deck, the lip to pivot relative to the deck between a pendent position and an extended position, the flexible seal comprising a tubular member that wraps around a total circumference of the hinge pin when the flexible seal is attached to the hinge pin, the tubular member having a slit along a length that is to enable the flexible seal to be at least one of coupled to or removed from the hinge pin after the hinge pin is coupled to the lip and the deck.

16. The seal of claim 15, wherein the flexible seal comprises a resiliently compressible foam material.

* * * * *